United States Patent [19]

Kobayashi et al.

[11] Patent Number: 6,160,788
[45] Date of Patent: Dec. 12, 2000

[54] DATA RECORDING MEDIUM, RECORDING AND REPRODUCING SYSTEM AND RESIDUAL AMOUNT DISPLAY METHOD

[75] Inventors: Toshiharu Kobayashi; Chisato Kitsukawa, both of Tokyo; Katsuyuki Koizumi, Kanagawa, all of Japan

[73] Assignee: Sony Corporation, Tokyo, Japan

[21] Appl. No.: 08/991,938

[22] Filed: Dec. 16, 1997

[30] Foreign Application Priority Data

Dec. 24, 1996 [JP] Japan ...................................... 8-343617

[51] Int. Cl.[7] ........................................................ G11B 7/24
[52] U.S. Cl. ...................... 369/275.1; 235/487; 235/492; 360/2; 369/47
[58] Field of Search .............................. 360/2; 369/275.1, 369/47; 235/492, 487

[56] References Cited

U.S. PATENT DOCUMENTS 4,973,828 11/1990 Naruse et al. .
5,122,643 6/1992 Gamou et al. .
5,478,995 12/1995 Wallerstorfer .
5,671,211 9/1997 Akashi et al. ........................ 369/275.1
5,801,364 9/1998 Kara et al. ..................................... 8/95
6,019,284 2/2000 Freeman .

*Primary Examiner*—Harold I. Pitts
*Attorney, Agent, or Firm*—Frommer Lawrence & Haug, LLP.; William S. Frommer; Joe H. Shallenburger

[57] ABSTRACT

A CPU can execute, for example, 4-bit processes, a program for data processes has been written in an ROM, and an RAM has memory areas for a work area and a user area of the CPU. Data supplied from the outside through an input terminal and an I/F circuit is recorded in a user area in the RAM. The recorded data is read out and supplied to the outside through an input/output terminal. An LCD displays a size (data residual amount) of an unused area in the RAM by, for example, a bar graph type. The ROM, RAM, I/F circuit, and driver are connected to the CPU by a bus line.

10 Claims, 5 Drawing Sheets

DATA RECORDING MEDIUM, RECORDING AND REPRODUCING SYSTEM AND RESIDUAL AMOUNT DISPLAY METHOD

BACKGROUND OF THE INVENTION

1. Field of the Invention

The invention relates to a recording medium such as an IC memory card and, more particularly, to a data recording medium which can display a residual amount of a memory capacity when a file of digital data of an image, music sound, text, or the like is recorded.

2. Description of the Related Art

Hitherto, in a tape medium to/from which data can be recorded and reproduced, a residual amount of a capacity can be confirmed by observing a residual amount of a reel by eyes. On the other hand, in case of a recording medium such as an IC memory card or the like, a memory residual amount cannot be confirmed by the eyes.

In the recording medium of the IC memory card or the like, therefore, in order to display a residual amount of the memory capacity, a method of adding a display portion such as an LCD (liquid crystal display) or the like has been proposed. The LCD displays the residual amount of the memory capacity by using a power source built in the IC memory card.

However, in order to display the memory residual amount even in a state where the IC memory card is detached from the main body, a backup power source is needed. There is, consequently, a problem that the power source is consumed.

OBJECTS AND SUMMARY OF THE INVENTION

It is, therefore, an object of the invention to provide a data recording medium which can display a residual amount of a memory capacity without a backup of a power source even in a data recording medium such as IC memory card, FD (floppy disk), MO (magnetooptic disk), or the like.

According to the invention disclosed in claim 1, there is provided a data recording medium to/from which data can be recorded and reproduced, wherein the data recording medium has display means including a ferroelectric liquid crystal element.

According to the invention disclosed in claim 9, there is provided a recording and reproducing system for recording and reproducing by using a data recording medium, comprising: a data recording medium; and a recording and reproducing apparatus for writing and reading data to/from the data recording medium, wherein the data recording medium has display means including a ferroelectric liquid crystal element.

According to the invention disclosed in claim 19, there is provided a residual amount display method of displaying a residual amount of a data recording medium to the data recording medium by N segments step by step, comprising the steps of: detecting the residual amount; quantizing the detected residual amount at N stages; and turning on and off the segments in accordance with the quantized residual amount.

The above and other objects and features of the present invention will become apparent from the following detailed description and the appended claims with reference to the accompanying drawings.

DETAILED DESCRIPTION OF THE PREFERRED EMBODIMENTS

Figure 1:
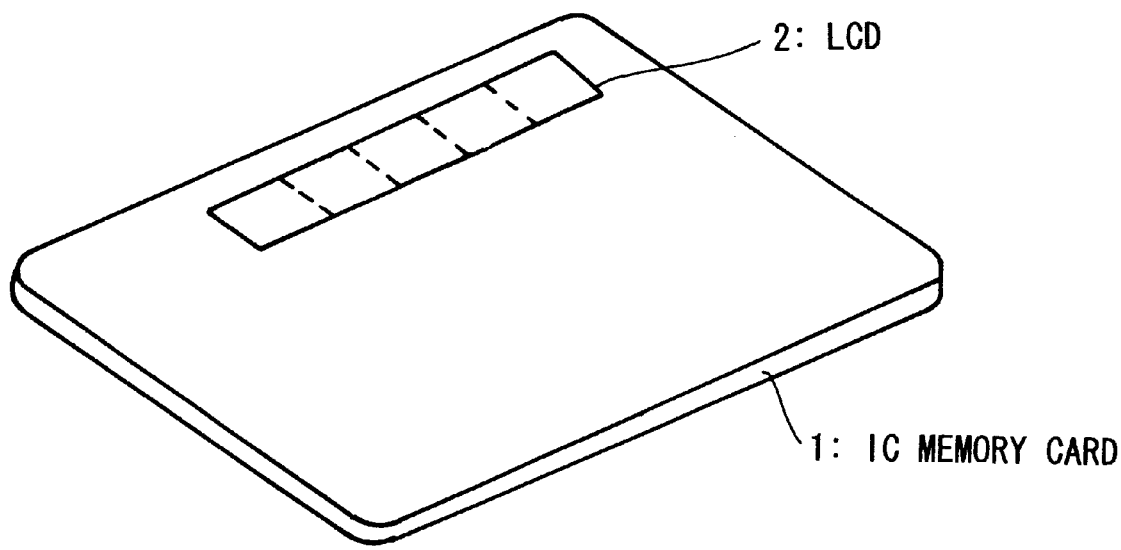
FIG. 1 is an external view of an example of an IC memory card of the invention.

An embodiment of the invention will now be described hereinbelow with reference to the drawings. FIG. 1 is an external view of an example of the invention. An IC memory card 1 is formed, for example, in a card shape having almost a size of a business card and is made of a plastics material as a whole. An LCD 2 is arranged on the surface of the IC memory card 1. The LCD 2 is made of ferroelectric high molecular liquid crystal and, in this example, informs the user of a memory residual amount by a display of five stages.

Figure 2:
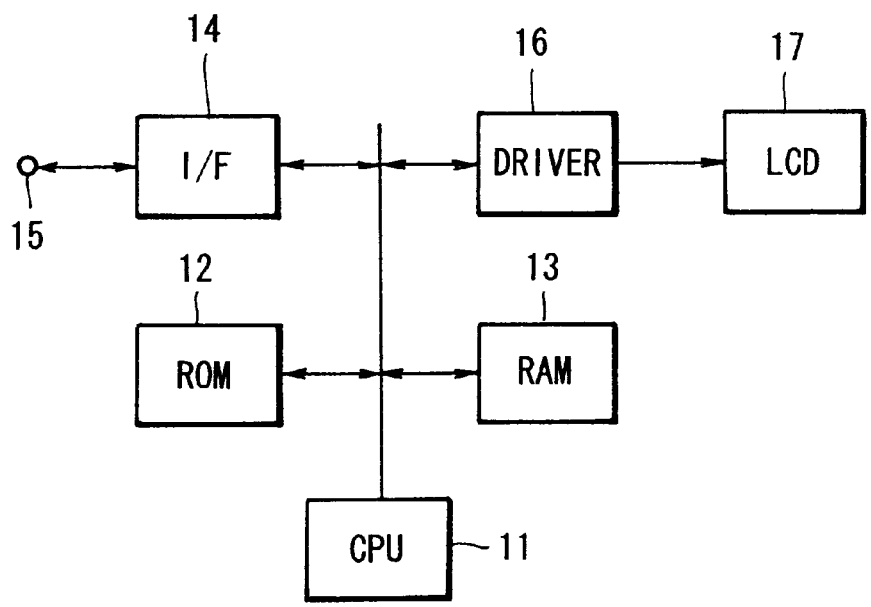
FIG. 2 is an internal block diagram of the IC memory card of the invention.

FIG. 2 shows an internal schematic block diagram of the IC memory card 1. The IC memory card 1 has a CPU 11, an ROM 12, an RAM 13, an I/F circuit 14, an input/output terminal 15, a driver 16, and an LCD 17. The CPU 11 can execute, for example, a 4-bit process. A program for data processes has been written in the ROM 12. The RAM 13 has memory areas for a work area and a user area of the CPU 11. The ROM 12 and RAM 13 are connected to the CPU 11 by a bus line.

The I/O terminal 15 is connected to the bus line of the CPU 11 through the I/F circuit 14. Data supplied from the outside through the I/O terminal 15 is recorded into the user area in the RAM 13. The data recorded in the user area in the RAM 13 is read out and supplied to the outside through the I/F circuit 14 and I/O terminal 15. The LCD 17 displays a size of unused area in the RPM 13 by, for example, a bar graph method. In the embodiment, it is displayed at five stages as mentioned above. The LCD 17 is controlled by the driver 16 connected to the CPU 11 by the bus line.

Figure 3:
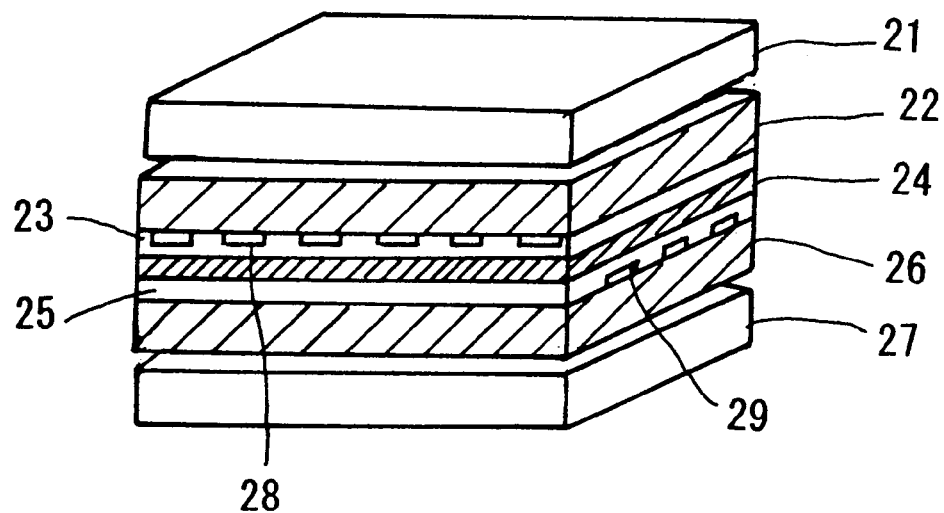
FIG. 3 is a schematic diagram of an example of a construction of an LCD according to the invention.

FIG. 3 shows a constructional example of a panel of the LCD 17. Ferroelectric high molecular liquid crystal 24 is arranged at the center. Insulating films 23 and 25 are arranged on the outside of the ferroelectric high molecular liquid crystal 24. A transparent electrode 28 is arranged in the insulating film 23. A transparent electrode 29 is arranged in the insulating film 25. Further, polarizing plates 21 and 27 are arranged on the outside of boards 22 and 26. The panel of FIG. 3 has a simple structure which doesn't need any orientation film. Further, by laminating a color filter onto the panel in FIG. 3, a variety of displays can be also performed.

Figure 4:
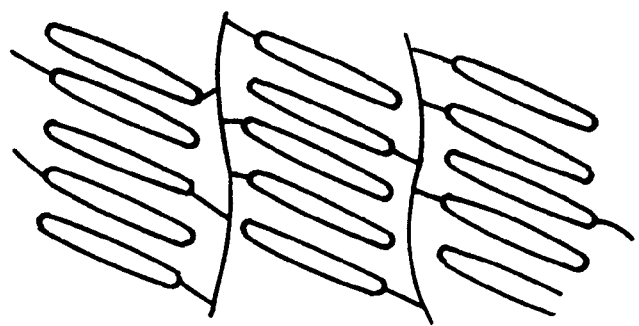
FIG. 4 is a schematic diagram of an example of ferroelectric high molecular liquid crystal according to the invention.

As shown in FIG. 4, the ferroelectric high molecular liquid crystal 24 is high molecular liquid crystal of a side chain type in which rod-shaped ferroelectric liquid crystal is suspended like a reed screen-shaped. In the LCD 17, for instance, by using the ferroelectric high molecular liquid crystal 24, the display can be maintained for a long time even if a power source for backup of the LCD 17 is not built in the IC memory card.

Figure 5:
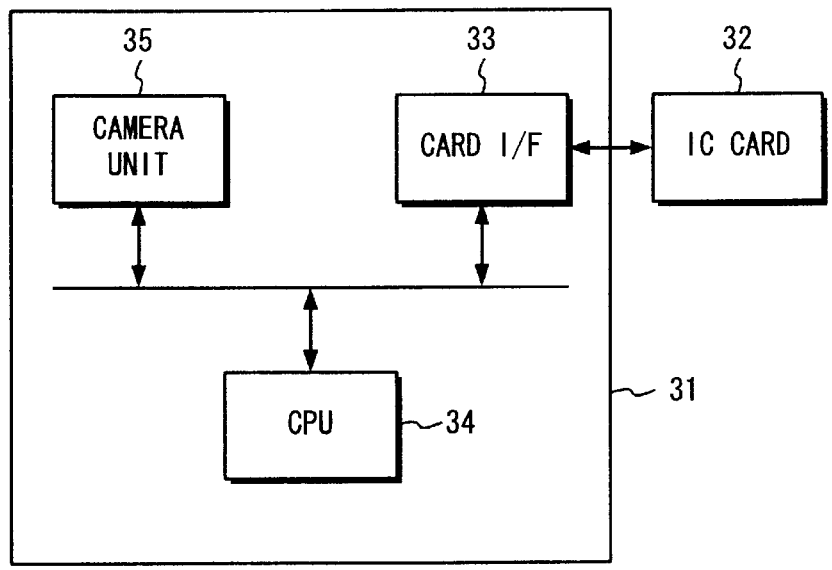
FIG. 5 is a schematic diagram of an example of a system to which the invention can be applied.

FIG. 5 shows an example of a system which can use the IC memory card. An IC memory card 32 is attached to a system 31, thereby transmitting and receiving data. For example, an electronic still camera is used as a system 31. The electronic still camera 31 has an IC card I/F circuit 33, a CPU 34, and a camera portion 35. The IC card I/F circuit 33 writes or reads out data into/from the IC memory card 32 and is controlled by the CPU 34. The CPU 34 controls the whole electronic still camera 31 and also controls the apparatus main body, for example, the camera portion 35 to which the IC memory card 32 is detachable. The electronic still camera 31 is shown as an example and as other devices, the IC memory card 32 can be used as a detachable recording medium in a telephone, an audio signal recording and reproducing apparatus, a video camera, and the like.

Figure 6:
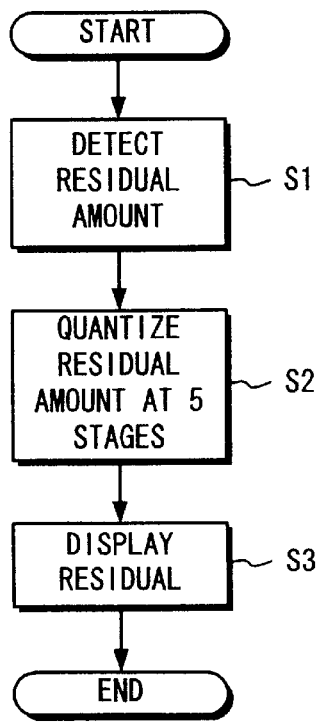
FIG. 6 is a flowchart of an example of a display control of/an LCD of the invention.

FIG. 6 shows a flowchart as an example for displaying a residual amount of the memory to the LCD 17 added to the IC memory card 1. For instance, the LCD 17 is controlled by the CPU 11 in the IC memory card 1. In step Si, the residual amount of the memory in the IC memory card 1 is detected. In step S2, the detected memory residual amount is quantized. For example, in case of displaying the memory residual amount at five stages, the quantization is performed at five stages. In step S3, the ON/OFF operations of each segment of the LCD 17 are controlled in accordance with a value of the quantized residual amount.

Figure 7:
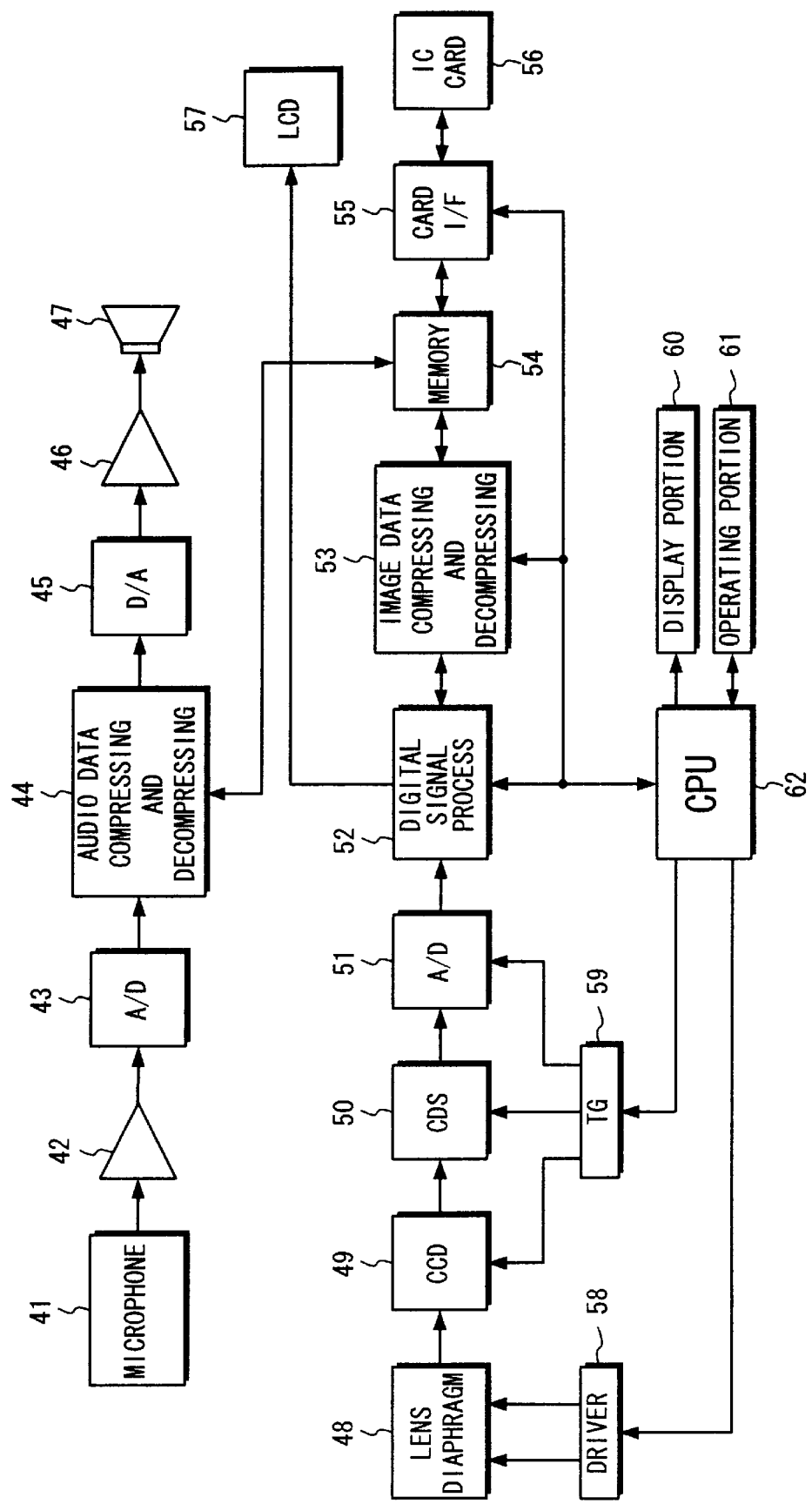
FIG. 7 is a block diagram of an example of a digital video camera to which the invention can be applied.

FIG. 7 shows an example of a digital video camera to which the invention is applied. An audio sound is inputted from a microphone shown at 41. The inputted audio sound is converted into an electric signal by an audio/electric signal converting device included in the microphone 41 and is supplied to an amplifier 42. The amplifier 42 amplifies the signal from the microphone 41 and limits to a necessary band. After that, the audio signal is converted into a digital signal at a sampling frequency that is two or more times as high as the necessary band by an A/D converting circuit 43. The digital audio data is encoded by an audio compressing unit of an audio data compressing and decompressing circuit 44 and is recorded in a memory area for audio in a memory 54 comprising a DRAM or the like.

The compressed audio data recorded in the memory 54 is read out through a card I/F circuit 55 and is recorded in an IC memory card 56. The IC memory card 56 has a function of a general memory card and is one of recording media which can be read and written by a personal computer. For example, data is recorded and reproduced into/from the IC memory card 56 in accordance with the DOS format. A connector to attach the IC memory card 56 can be also arranged between the card I/F circuit 55 and IC memory card 56.

The compressed audio data recorded in the IC memory card 56 is read out through the card I/F circuit 55. The read-out compressed audio data is written into the memory area for audio in the memory 54. The written compressed audio data is decompressed in a real-time manner in an audio decompressing unit of the audio data compressing and decompressing circuit 44. The decompressed audio data is supplied to a D/A converter 45 and is converted into an analog signal. The analog audio signal is amplified by an amplifier 46 and is generated from a speaker 47 as a sound.

An image of a photographing object serving as a motion image is inputted from a lens diaphragm portion 48. The object image is inputted from the lens diaphragm portion 48 to a CCD image pickup device 49. In the CCD image pickup device 49, the object image is accumulated as charges and converted into an electric signal. The electric signal is supplied as a motion image signal to a CDS circuit 50. The CDS circuit 50 is a correlation double sampling circuit for reducing noises. A CPU 62 controls a driver 58 of a mechanical system of the lens diaphragm portion 48. The CPU 62 controls a timing signal generating unit 59 of an electric system of the CCD image pickup device 49, CDS circuit 50, and an A/D converter 51.

An output signal of the CDS circuit 50 is supplied to the A/D converter 51 and is converted into a digital signal at an optimum sampling frequency, for example, a sampling frequency that is integer times as high as a subcarrier frequency of an NTSC signal. The digital signal is supplied to a digital signal processing circuit 52. The digital signal processing circuit 52 executes ordinary camera signal processes such as gamma correction, color separation, and the like to the supplied signal, thereby forming a luminance signal Y and color difference signals Cb and Cr. Those signals are encoded by an image compressing unit of an image data compressing and decompressing circuit 53 and are recorded into a memory area for image in the memory 54 serving as a storage device. The compressed image data recorded in the memory area for image in the memory 54 is read out through the card I/F circuit 55 and is outputted to the IC memory card 56 and recorded.

The compressed image data recorded in the IC memory card 56 is read out through the card I/F circuit 55. The read-out compressed image data is written into the memory area for image in the memory 54. The written compressed image data is decompressed in a real-time manner in an image decompressing unit of the image data compressing and decompressing circuit 53. The decompressed motion image data is supplied to the digital signal processing circuit 52. The luminance signal Y and color difference signals Cb and Cr supplied to the digital signal processing circuit 52 are digitally decoded into, for example, an NTSC signal and are outputted as a D/A converted video signal to an LCD 57.

The CPU 62 controls the operation in the camera in accordance with an instruction from an operating portion 61 or an external operating instruction of a remote controller (not shown) or the like. An internal state of the camera or the like is displayed in a display portion 60 constructed by, for example, an LCD, an LED, an EL, or the like.

Figure 8:
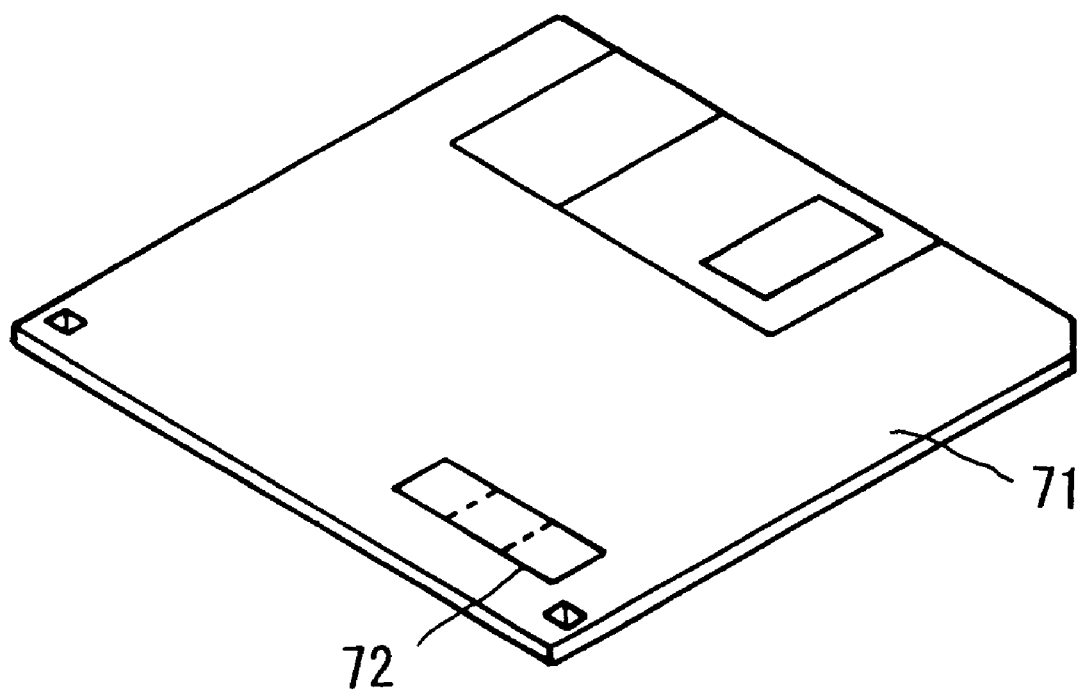
FIG. 8 shows another example of a data recording medium to which the invention can be applied.

Although the embodiment has been described mainly with respect to the IC memory card, the invention is not limited to it. Since the invention doesn't need any backup power source, as shown in FIG. 8, by adding an LCD 72 to a floppy disk 71, a memory residual amount of the floppy disk 71 can be confirmed by the eyes. Although not shown, a memory capacity of an MO or the like can be also confirmed by eyes.

Although the embodiment has been described with respect to the display of the residual amount of the memory of the recording medium, it can be also used to display a remaining amount of money in an IC cash card.

Further, in the embodiment, although the memory residual amount is displayed in the LCD of the IC memory card, the data amount which has already been recorded can be also displayed in an LCD.

The present invention is not limited to the foregoing embodiments but many modifications and variations are possible within the spirit and scope of the appended claims of the invention.

What is claimed is:

1. A recording and reproducing system for recording and reproducing by using a data recording medium, comprising:
   a data recording medium; and
   a recording and reproducing apparatus for writing and reading data to/from said data recording medium, wherein said data recording medium has display means which includes a ferroelectric liquid crystal element.

2. A system according to claim 1, wherein said data includes image data.

3. A system according to claim 1, wherein said data includes audio data.

4. A system according to claim 1, wherein said display means displays an amount of recorded data.

5. A system according to claim 1, wherein said display means displays an amount of data which can be recorded.

6. A system according to claim 1, wherein said data recording medium is an IC memory card.

7. A system according to claim 1, wherein said data recording medium is a disk-shaped recording medium.

8. A system according to claim 1, wherein said display means performs a display of a bar graph type.

9. A system according to claim 1, wherein said data recording medium is an IC cash card.

10. A system according to claim 9, wherein said display means displays a remaining amount of money.

* * * * *